(No Model.)

R. BAGALEY.
TESTING MACHINE.

No. 390,550. Patented Oct. 2, 1888.

WITNESSES:
INVENTOR,
Ralph Bagaley
by Darwin S. Wolcott
Att'y.

UNITED STATES PATENT OFFICE.

RALPH BAGALEY, OF PITTSBURG, PENNSYLVANIA.

TESTING-MACHINE.

SPECIFICATION forming part of Letters Patent No. 390,550, dated October 2, 1888.

Application filed June 6, 1888. Serial No. 276,234. (No model.)

*To all whom it may concern:*

Be it known that I, RALPH BAGALEY, a citizen of the United States, residing at Pittsburg, in the county of Allegheny and State of Pennsylvania, have invented or discovered a certain new and useful Improvement in Testing-Machines, of which improvement the following is a specification.

In Letters Patent No. 385,833, granted to me July 10, 1888, I have described an apparatus for determining the balance, or, rather, the lack of balance, of rotating bodies, said apparatus consisting, essentially, of a shaft carrying the body whose balance is to be adjusted, said shaft being mounted in yielding bearings. In said apparatus a marker is employed for marking on the rotating body the point of excessive or overbalancing weight; but while determining the location of excessive weight with sufficient accuracy such device cannot furnish any data whereby the amount or weight of material to be removed from the rotating body can be determined.

The object of the invention described herein is to provide for the determination with practical accuracy not only of the location of excessive weight at one point in a rotating body, but also the amount to be removed from said point or added to a diametrically-opposite point in order that the body may rotate truly.

In general terms, the invention consists in the construction and combination of mechanical devices or elements, all as more fully hereinafter described and claimed.

Figure 1:
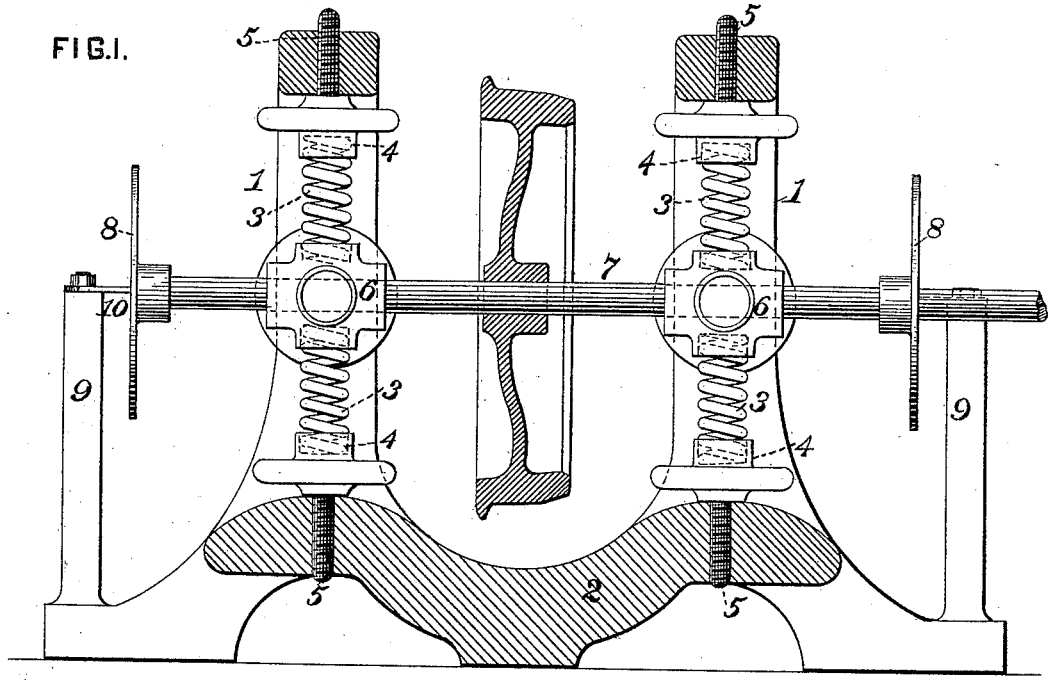
Figure 2:
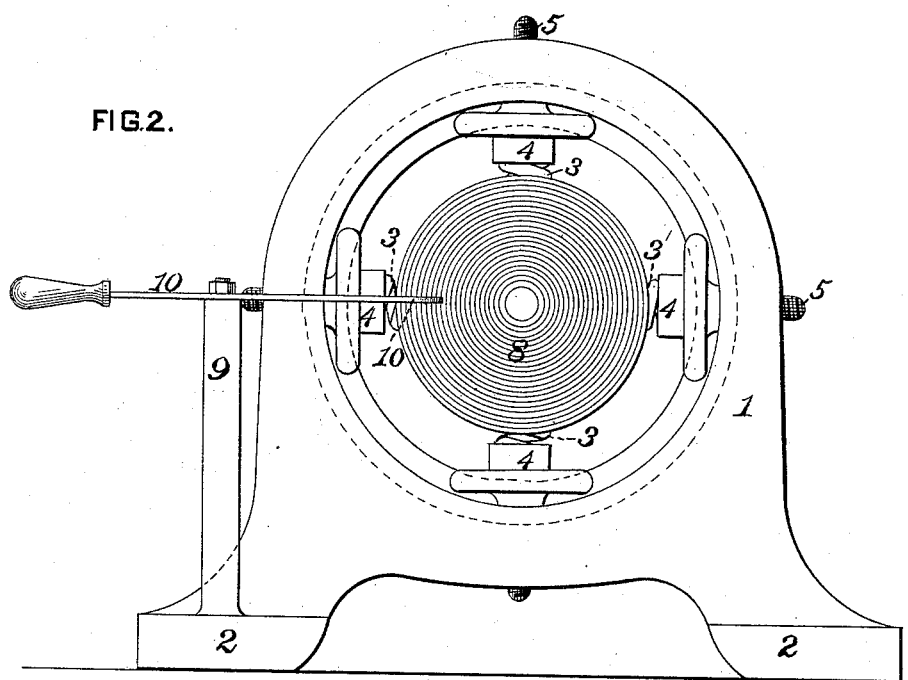

In the accompanying drawings, forming a part of this specification, Figure 1 is a sectional elevation of balancing-machine having my improved indicator applied thereto, and Fig. 2 is an end view of said machine.

The balancing-machine proper is preferably constructed similar to that described in the application hereinbefore referred to, and consists of housings 1, secured to or formed on the base 2. In the openings or windows of the housings are arranged a series of springs, 3, preferably four in number, having their outer ends resting in sockets 4, formed in the heads of screws 5, passing through threaded holes in the housings, and their inner ends bearing against journal-boxes 6, which are provided with suitable sockets or recesses for the reception of the ends of the springs. These springs serve to hold the journal-boxes in a state of equilibrium, or free to move in any direction under any actuating force.

In the journal-boxes 6 is mounted a shaft, 7, carrying the body to be tested—as, for example, a car-wheel, as shown in Fig. 1. As fully described in the application hereinbefore referred to, a preponderance of weight on any part of the wheel will, by its centrifugal action when the wheel is rotated, tend to carry the wheel and its shaft around a line passing through the axis of the shaft when normal or at rest, and that part of the wheel having the preponderating weight will describe a circle of greater radii than any other part of the wheel, and hence if a piece of chalk or other marking device be held within the circle described by the wheel only that part of the wheel having the preponderating weight would come into contact with the marker. This manner of marking is effective in determining the location of the preponderating weight, but affords no data whereby the weight or quantity of metal to be removed or added to the wheel or other rotating body may be determined. In order to obtain such data, I place a disk, 8, on the shaft, and upon a suitable stationary support, 9, within proximity of the disk, is located a pointer or index, 10. As this disk will partake of the movements of the shaft and wheel or other rotating body mounted on said shaft, it follows that if the pointer be brought into contact with the face of the disk while it will inscribe a circle thereon whose center will be outside of the center of the disk, the amount of such eccentricity will be proportional to the excess of weight at one part of the wheel or rotating body, and that point of the inscribed circle which approaches nearest to the center of the disk will be in the plane passing through the axis of the wheel and the point of preponderating weight on the wheel or rotating body. If now a number of circular lines having their centers coinciding with the center of the disks be formed on the face of the disk with which the pointer comes into contact, and the distance of said lines from a starting-point be proportioned to the distances which certain preponderating weights—*e. g.*, one, two, three, or more ounces or pounds—will, under centrifugal action produced by a certain number of revolutions, cause the axis of the shaft to diverge from a line coinciding with said axis when the shaft is at rest or in normal position, not only can the location, but also the amount, of the preponderating weight be ascertained by observing the line to which index points while the wheel is rotating.

The index or pointer should be arranged in the same horizontal plane as the axis of the shaft when at rest, or normal. If desired, a marker operative on the wheel may be employed in connection with the indicating device herein described.

Where the preponderating weight is located to one side of a plane at right angles to the axis bisecting the wheel equally, the end of the shaft on the same side of the bisecting plane as the preponderating weight will have a greater amplitude of motion than the opposite end of the shaft, or even of the wheel itself, and hence the indicating-disk on such end of the shaft will afford a better indication than when the marker is applied to the wheel.

The principal characteristic of my invention is the employment of a graduated disk to which is imparted movements of a character identical in kind with those of the body being tested in connection with a fixed reference-point or index.

I claim herein as my invention—

1. In an apparatus for balancing wheels and other bodies capable of being rotated, the combination of a shaft carrying the wheel or body to be balanced, one or more bearings for said shaft free to move in one or more directions, an indicating device movable with the wheel or body to be tested, and a fixed reference-point, substantially as set forth.

2. In an apparatus for balancing wheels and other bodies capable of being rotated, the combination of a shaft carrying the wheel or body to be balanced, one or more bearings for said shaft having yielding support or supports, one or more graduated disks movable with the wheel or other body, and a fixed reference-point or index, substantially as set forth.

In testimony whereof I have hereunto set my hand.

RALPH BAGALEY.

Witnesses:
DARWIN S. WOLCOTT,
R. H. WHITTLESEY.